United States Patent
Lin et al.

(10) Patent No.: US 7,949,257 B2
(45) Date of Patent: May 24, 2011

(54) SYSTEM AND METHOD FOR TUNABLE CHROMATIC DISPERSION COMPENSATION

(75) Inventors: Christopher Lin, El Cerrito, CA (US); Mark Summa, Painted Post, NY (US); Martin Williams, Corning, NY (US); Douglas Butler, Painted Post, NY (US); Peter Wigley, Corning, NY (US)

(73) Assignee: Oclaro (North America), Inc., San Jose, CA (US)

( * ) Notice: Subject to any disclaimer, the term of this patent is extended or adjusted under 35 U.S.C. 154(b) by 741 days.

(21) Appl. No.: 11/938,754

(22) Filed: Nov. 12, 2007

(65) Prior Publication Data

US 2010/0284701 A1    Nov. 11, 2010

(51) Int. Cl.
- H04B 10/08 (2006.01)
- H04B 10/12 (2006.01)
- H04B 10/00 (2006.01)
- H04J 14/02 (2006.01)

(52) U.S. Cl. ............ 398/81; 398/33; 398/147; 398/159

(58) Field of Classification Search ................ 398/33, 398/81, 147–150, 158, 159, 173
See application file for complete search history.

(56) References Cited

U.S. PATENT DOCUMENTS

| | | |
|---|---|---|
| 4,750,833 A | 6/1988 | Jones |
| 4,799,790 A | 1/1989 | Tsukamoto et al. |
| 6,088,088 A | 7/2000 | Fortenberry |
| 6,313,934 B1 | 11/2001 | Fortenberry |
| 6,429,929 B2 | 8/2002 | Babin et al. |
| 6,515,779 B2 | 2/2003 | Fee |
| 6,765,659 B1 | 7/2004 | Bhatnagar et al. |
| 6,822,747 B1 | 11/2004 | Li et al. |
| 6,842,547 B2 | 1/2005 | Bülow |
| 6,889,011 B1 | 5/2005 | Fee et al. |
| 7,139,118 B2 * | 11/2006 | Griggs et al. .............. 359/337.1 |
| 7,162,154 B2 | 1/2007 | Noé |
| 7,536,108 B2 * | 5/2009 | Hirano et al. ................. 398/147 |
| 7,715,092 B2 * | 5/2010 | Bolshtyansky et al. ....... 359/334 |

* cited by examiner

*Primary Examiner* — Dalzid Singh
(74) *Attorney, Agent, or Firm* — Patterson & Sheridan, L.L.P.

(57) ABSTRACT

One embodiment sets forth a technique for measuring chromatic dispersion using reference signals within the operational range of amplifiers used to refresh data signals. One red/blue laser pair in the transmission node is used for measuring dispersion and chromatic dispersion compensation is added at each line node in the system. Since reference and data signals propagate through each amplifier, the reference signals used to measure chromatic dispersion receive the same dispersion compensation (and will have the same residual dispersion) as the data signals. Therefore, any residual dispersion in the data signals will manifest itself in downstream dispersion measurements and, thus, can be corrected. The tunable dispersion compensator in each line node may be set to compensate for the measured dispersion, thereby compensating for both the chromatic dispersion of the link connecting the current node to the prior node and any uncorrected residual dispersion from prior nodes.

17 Claims, 5 Drawing Sheets

SYSTEM AND METHOD FOR TUNABLE CHROMATIC DISPERSION COMPENSATION

BACKGROUND OF THE INVENTION

1. Field of the Invention

The present invention relates generally to the field of fiber optic networks and more specifically to a system and method for tunable chromatic dispersion compensation.

2. Description of the Related Art

A typical fiber optic communication system includes transmission nodes, line nodes, and links. Transmission nodes are terminal nodes that include optical signal sources, such as a laser. Line nodes typically include optical amplifiers, couplers, and decouplers. In many common applications, the line nodes also include other devices, such as chromatic dispersion compensators. Links are used to convey optical signals between nodes.

Lasers that transmit optical signals on links, such as optical fibers, provide a narrow spectrum of light (i.e., a light pulse) that includes many wavelengths. Chromatic dispersion is a variation in the velocity of this signal according to wavelength. Among other things, this variation in velocity causes the light pulses of an optical signal to broaden as they travel through the link. This phenomenon, known as "pulse spreading," can cause increased bit error rates if the light pulses spread to a point where they begin to overlap with one another. Chromatic dispersion increases linearly with distance traveled in the link. A tunable chromatic dispersion compensator is settable (with a finite resolution) and can be used to compensate for chromatic dispersion, without knowing the actual link length, using chromatic dispersion measurements.

One approach to measuring chromatic dispersion uses optical supervisory channel (OSC) reference signals of a link for measuring and mapping phase delay as a function of wavelength after propagating the reference signals through the link. For example, an OSC laser can be used to add reference signals at each transmitter and line node. After propagating through a link, the OSC signals are decoupled from the data signals and then used to determine the chromatic dispersion of the link. Subsequently, new OSC signals are coupled to the data signals and propagated to the next node. This approach measures the chromatic dispersion between a pair of adjacent nodes (i.e., across one link) within the system and uses this measurement to set the tunable chromatic dispersion compensator within the downstream node of the pair of adjacent nodes.

One drawback to this approach, however, is that dispersion compensators have finite resolution, which may result in residual dispersion that is not corrected. If there is residual dispersion for each link in the system, then the residual dispersion may accumulate downstream in the system. Another drawback is that OSC lasers typically have poorly controlled wavelengths, leading to general inaccuracies. This problem can be addressed by using more precise lasers at each node, but such a solution is expensive and does not necessarily ensure that there will be no residual dispersion. Again, if any residual dispersion exists at the nodes, then the dispersion accumulation problem may still persist, increasing bit rate errors.

As the foregoing illustrates, what is needed in the art is a more effective technique for compensating for chromatic dispersion that occurs between and across the nodes of a multi-node fiber optic communication system.

SUMMARY OF THE INVENTION

One embodiment of the present invention sets forth a line node for use in an optical transmission system. The line node includes a dual-stage amplifier having a first stage and a second stage, phase detection circuitry disposed between an output of the first stage and an input of the second stage and configured to measure a phase change in an extracted reference signal and compute an implied dispersion based on the phase change, and a chromatic dispersion compensator disposed between the output of the first stage and the input of the second stage and configured to dispersion compensate a signal received at the first stage, based on the implied dispersion, to produce a dispersion-compensated signal that is transmitted to the second stage.

One advantage of the disclosed line node is that, since reference and data signals propagate through each amplifier, the reference signals used to measure chromatic dispersion receive the same dispersion compensation (and will have the same residual dispersion) as the data signals. Consequently, any residual dispersion in the data signals will manifest itself in downstream dispersion measurements and, thus, can be corrected. The dispersion compensator in each line node may be set to compensate for the measured dispersion, thereby compensating for both the chromatic dispersion of the link connecting the current node to the prior node and any uncorrected residual dispersion from prior nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
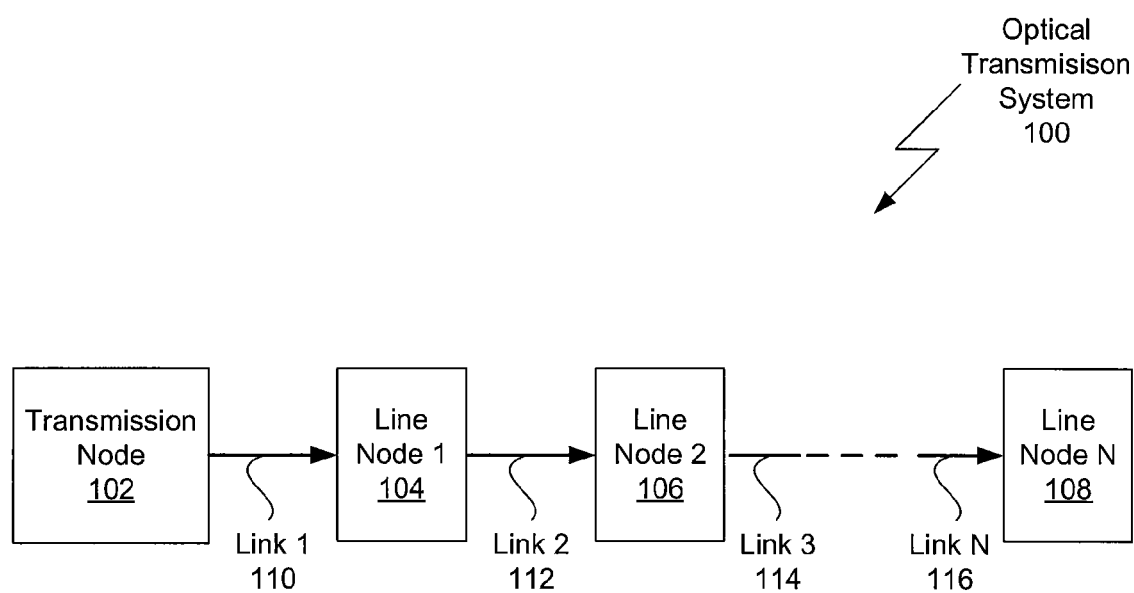
FIG. 1 depicts an optical transmission system in which one or more aspects of the invention may be implemented.

FIG. 1 depicts an optical transmission system 100 in which one or more aspects of the invention may be implemented. As shown, the optical transmission system 100 includes, without limitation, a transmission node 102, a line node 1 104, a line node 2 106, and a line node N 108. The optical transmission system 100 also includes a link 1 110 between the transmission node 102 and the line node 1 104, a link 2 112 between the line node 1 104 and the line node 2 106, a link 3 114 between the line node 3 106 and the next line node in the system, and a link N 116 between the next-to-last node in the system and the line node N 108. The transmission node 102 is a terminal node and is configured to generate and transmit optical signals through the link 1 110 to the line node 1 104. The line node 1 104 is configured to receive the optical signals through the link 1 110, regenerate these optical signals, and send these regenerated signals through the link 2 112. The line node 2 106 is configured to receive the optical signals thru the link 2 112, regenerate these signals, and send these regenerated signals through the link 3 114. The line node N 108 is configured to receive the optical signals from the link N 116. Each of the links 110, 112, 114, and 116 comprises an optical transmission medium, such as optical fiber.

Figure 2:
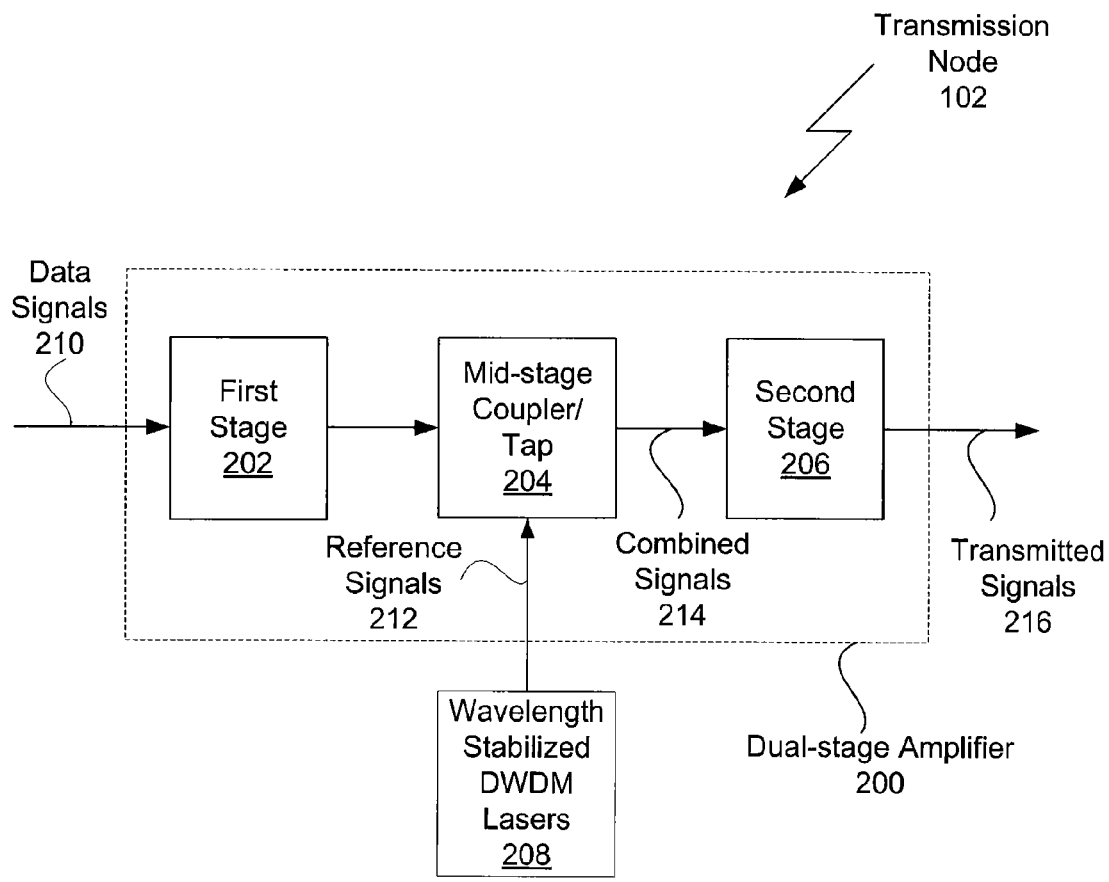
FIG. 2 illustrates the transmission node used for generating amplified combined signals, according to one embodiment of the invention.

FIG. 2 illustrates the transmission node 102 of FIG. 1 used for generating amplified combined signals, according to one embodiment of the invention. As shown, the transmission node 102 includes wavelength stabilized DWDM (dense wavelength division multiplexing) lasers 208 and a dual-stage amplifier 200.

The wavelength stabilized DWDM lasers 208 are configured to multiplex together a red/blue laser pair and synchronously modulate these signals onto pure sine waves of various frequencies to produce reference signals 212 for chromatic dispersion measurements. Since the reference signals 212 are regular DWDM wavelengths, the reference signals 212 can pass through the dual-stage amplifier 200 in the transmission node 102, each of the links 110, 112, 114, and 116, and each of the line nodes 104, 106, and 108. Thus, the reference signals 212 can be used for chromatic dispersion measurements throughout the optical transmission system 100.

As also shown, the dual-stage amplifier 200 includes a first stage 202, a mid-stage coupler/tap 204, and a second stage 206. The first stage 202 amplifies the data signals 210. The mid-stage coupler/tap 204 optically multiplexes the reference signals 212 onto the data signals 210, creating combined signals 214. The second stage 206 amplifies the combined signals 214, creating transmitted signals 216. The transmitted signals 216 are sent through the link 1 110 to the line node 1 104.

Figure 3:
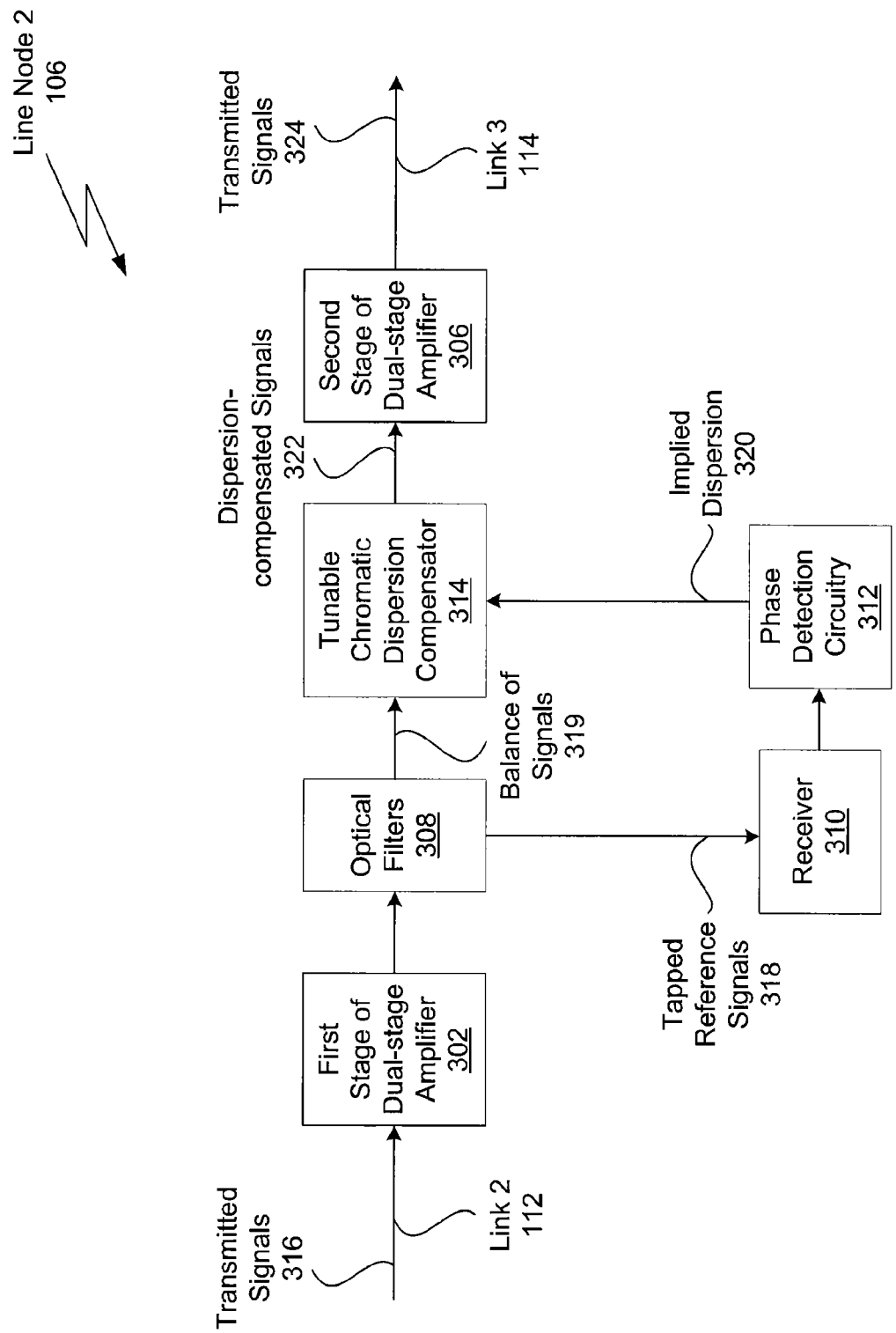
FIG. 3 illustrates the line node used to create regenerated dispersion-compensated signals according to one embodiment of the invention.

FIG. 3 illustrates the line node 2 106 of FIG. 1 used to create regenerated dispersion-compensated signals, according to one embodiment of the invention. As shown, the line node 2 106 includes a first stage of a dual-stage amplifier 302, a tunable chromatic dispersion compensator 314, optical filters 308, a receiver 310, phase detection circuitry 312, and a second stage of the dual-stage amplifier 306.

The first stage of the dual-stage amplifier 302 amplifies transmitted signals 316 received through the link 2 112. The signals may be tapped for chromatic dispersion measurement, and the tunable chromatic dispersion compensator 314 may dispersion compensate the signals, creating dispersion-compensated signals 322. The second stage of the dual-stage amplifier 306 amplifies the dispersion compensated signals 322, generating transmitted signals 324. The line node 2 106 passes the transmitted signals 324 downstream through the link 3 114 to the next line node in the system 100.

The optical filters 308 are configured to output two sets of signals: tapped reference signals 318 and a balance of signals 319. The balance of signals 319 includes data signals and a balance of the reference signals. The receiver 310 processes the tapped reference signals 318 and passes those signals to the phase detection circuitry 312. In one embodiment, the phase detection circuitry 312 measures the phase delays of the tapped reference signals 318, uses these measurements to generate a mapping of phase delay as a function of wavelength, and further uses this mapping to calculate an implied dispersion 320. The implied dispersion 320 may then be used to set the tunable chromatic dispersion compensator 314.

The tunable chromatic dispersion compensator 314 has finite resolution. Therefore, the dispersion-compensated signals 322 may have uncorrected residual dispersion. Similarly, the transmitted signals 316 entering the line node 2 106 may have uncorrected residual dispersion from the tunable chromatic dispersion compensator (since it has finite resolution too) in the line node 1 104 of FIG. 1. As persons skilled in the art will recognize, the tapped reference signals 318 used for calculating the implied dispersion 320 reflect both the residual dispersion present in the transmitted signals 316 as well as the chromatic dispersion from the link 2 112. Thus, setting the tunable chromatic dispersion compensator 314 to correct for the implied dispersion 320 compensates for both the residual dispersion remaining after the line node 1 104 and the additional chromatic dispersion from the link 2 112.

Persons skilled in the art will recognize that, in alternate embodiments, the dual-stage amplifier of line node 2 106 may be configured to allow signals to be tapped after the dispersion compensation is added to the signals. In such a configuration, the chromatic dispersion-compensated signals 322 may be tapped and fed through the optical filter 308, the receiver 310, and the phase detection circuitry 312 to calculate the implied dispersion 320, which is then used to adjust the setting of the chromatic dispersion compensator 314. As persons skilled in the art will also recognize, this feedback loop can be repeated as many times as desired for convergence, thereby reducing the uncorrected residual dispersion within the transmitted signals 324.

Figure 4:
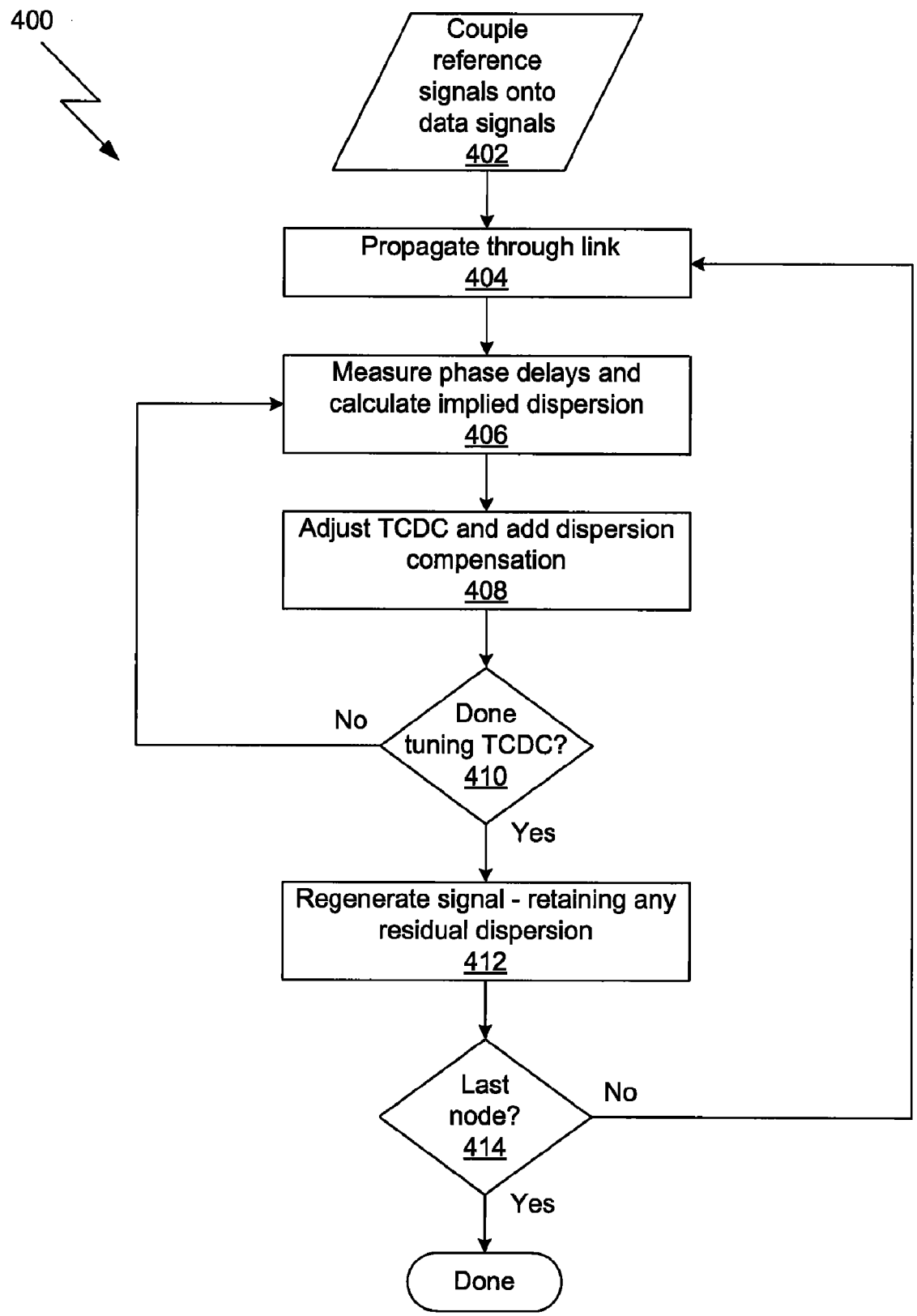
FIG. 4 is a flow diagram of method steps for chromatic dispersion compensation throughout a multi-node optical transmission system, according to one embodiment of the invention.

FIG. 4 is a flow diagram of method steps for chromatic dispersion compensation throughout a multi-node optical transmission system, according to one embodiment of the invention. Although the method steps are described in conjunction with the systems of FIGS. 1, 2, and 3, persons skilled in the art will understand that any system that performs the method steps, in any order, is within the scope of the invention.

As shown, the method 400 begins at step 402, where the reference signals 212 are coupled onto the data signals 210 at the transmission node 102. In step 404, the transmitted signals 216 propagate through the link 1 110 to the line node 1 104. In step 406, the phase delays of the signals are measured and the implied dispersion is calculated. In step 408, the tunable chromatic dispersion compensator is adjusted to compensate for the implied dispersion and dispersion compensation is added to the signals. At step 410, the tunable chromatic dispersion compensator may be controlled in a closed-loop method by returning to steps 406 and 408—measuring and correcting for the residual dispersion of the dispersion-compensated signals. When the optimal level of residual dispersion is reached, the method continues at step 412.

In step 412, all signals are regenerated—retaining any residual dispersion produced by the tunable chromatic dispersion compensator in the line node 1 104. At step 416, if there are any more line nodes in the optical transmission system 100, the method returns to step 404, where the optical signals propagate through the next link to the next line node in the system. The method continues in this fashion until the net chromatic dispersion between the transmission node 102 and the line node N 108 is measured and the calculated chromatic dispersion compensation is added at the line node N 108.

Figure 5:
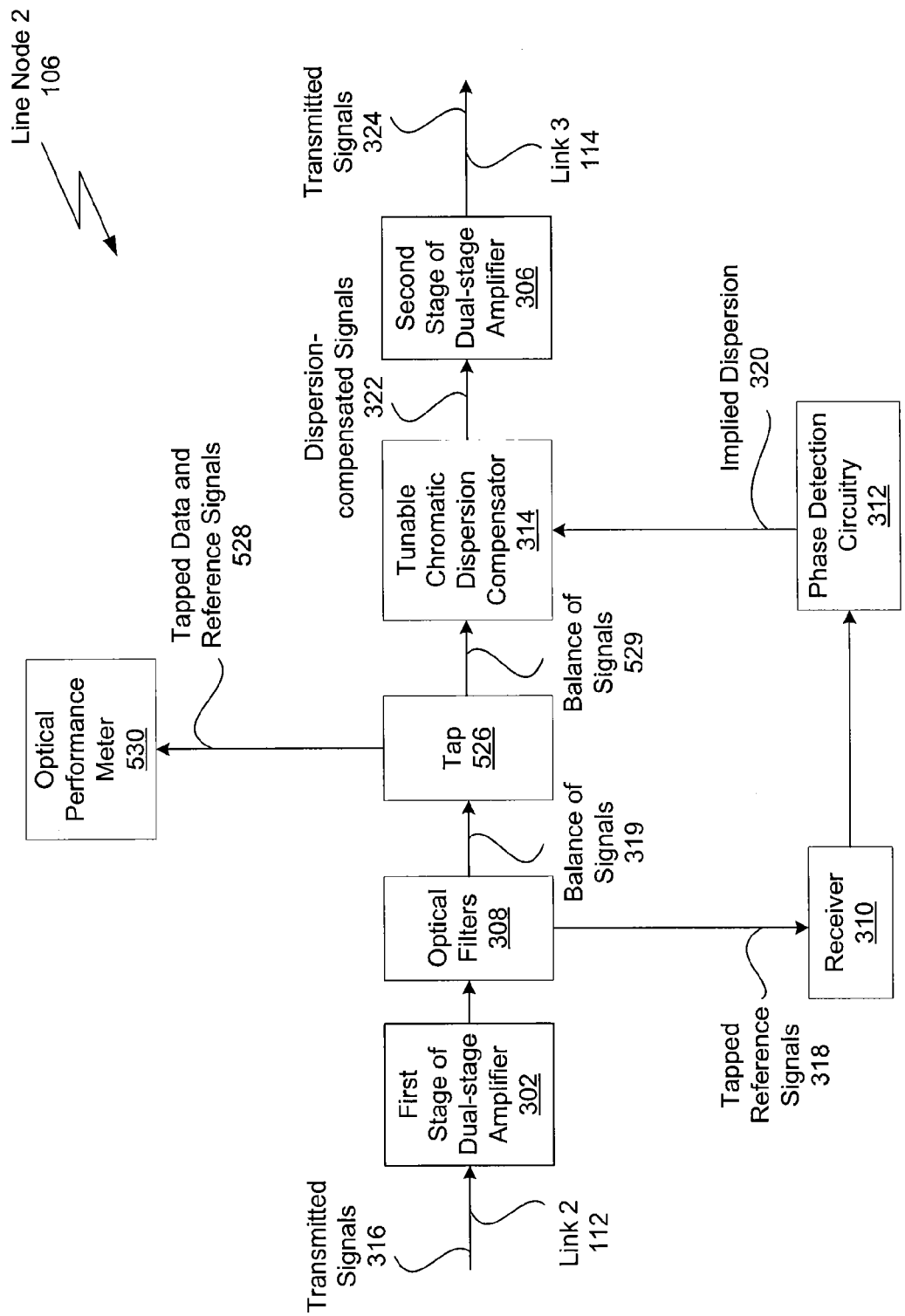
FIG. 5 illustrates the line node used to create regenerated dispersion-compensated signals and monitor optical performance, according to one embodiment of the invention.

FIG. 5 illustrates the line node 2 106 of FIG. 1 used to create regenerated dispersion-compensated signals and monitor optical performance, according to one embodiment of the invention. As shown, the line node 2 106 includes the first stage of a dual-stage amplifier 302, the tunable chromatic dispersion compensator 314, the optical filters 308, the receiver 310, the phase detection circuitry 312, a tap 526, an optical performance meter 530, and the second stage of the dual-stage amplifier 306.

The first stage of the dual-stage amplifier 302 amplifies transmitted signals 316 received through the link 2 112 and passes the signals to the optical filters 308. The optical filters 308 are configured to output two sets of signals: the tapped reference signals 318 and the balance of signals 319. The receiver 310 processes the tapped reference signals 318 and passes those signals to the phase detection circuitry 312. The phase detection circuitry 312 calculates the implied dispersion 320. The implied dispersion 320 may then be used to set the tunable chromatic dispersion compensator 314. The balance of signals 319 includes data signals and the balance of the reference signals. The balance of signals 319 may be tapped at the tap 526 and be subdivided into tapped data and reference signals 528 and a balance of signals 529. The tapped data and reference signals 528 may be fed into the optical performance meter 530, where the reference signals in the tapped data and reference signals 528 may provide the wavelength reference for the optical performance meter 530. The tunable chromatic dispersion compensator 314 dispersion compensates the balance of signals 529, creating the dispersion-compensated signals 322. The second stage of the dual-stage amplifier 306 amplifies the dispersion compensated signals 322, generating the transmitted signals 324. The line node 2 106 passes the transmitted signals 324 downstream through the link 3 114 to the next line node in the system 100.

In sum, improved signal quality, through reduced bit rate errors, may be achieved by measuring chromatic dispersion using reference signals within the operational range of amplifiers used to refresh data signals. In one embodiment, red/blue wavelength stabilized DWDM lasers in the transmission node generate reference signals, existing amplifiers in each line node regenerate these reference signals, and tunable chromatic dispersion compensators between the output of the first stage and the input of the second stage of these amplifiers add chromatic dispersion compensation to all data signals and reference signals. In this embodiment only a single pair of dedicated, wavelength stabilized DWDM lasers is added to the existing system. This results in cost sharing of the lasers over all of the nodes in the system and is a direct benefit of selecting wavelengths within the amplification band of the optical amplifiers. Reference signals are coupled onto data signals at the transmission node and subsequently propagate through the links and line nodes with the data signals. As a result, the reference signals used to measure chromatic dispersion receive the same chromatic dispersion compensation as the data signals in each node and, therefore, exhibit the same residual dispersion as the data signals.

One advantage of the systems disclosed herein is that a tunable chromatic dispersion compensator in each line node may be set to compensate for the measured dispersion, thereby compensating for both the chromatic dispersion of the link connecting the current node to the prior node and any uncorrected residual dispersion from prior nodes. Furthermore, the residual dispersion may be measured after the tunable chromatic dispersion compensator at each line node, allowing closed-loop feedback control of each tunable chromatic dispersion compensator. This closed-loop feedback control is more precise than the conventional open-loop method and may further reduce residual dispersion. In some embodiments, the reference light used for the chromatic dispersion compensation may also be used for other purposes, such as providing a reference for a tunable filter used for optical performance monitoring. Re-using the reference light in such a fashion further amortizes the cost of adding the reference lasers to the system While the foregoing is directed to embodiments of the present invention, other and further embodiments of the invention may be devised without departing from the basic scope thereof, and the scope thereof is determined by the claims that follow.

We claim:

1. A line node for use in an optical transmission system, the line node comprising:
   a dual-stage amplifier that includes a first stage and a second stage;
   phase detection circuitry disposed between an output of the first stage and an input of the second stage and configured to measure a phase change in an extracted reference signal and compute an implied dispersion based on the phase change, wherein the phase detection circuitry is configured to use a mapping of phase change as a function of wavelength for a plurality of extracted reference signals to compute the implied dispersion; and
   a chromatic dispersion compensator disposed between the output of the first stage and the input of the second stage and configured to dispersion compensate a signal received at the first stage, based on the implied dispersion, to produce a dispersion-compensated signal that is transmitted to the second stage.

2. The line node of claim 1, wherein the second stage is configured to amplify the dispersion-compensated signal for transmission to another line node in the optical transmission system.

3. The line node of claim 1, wherein the signal received at the first stage comprises a reference signal and a data signal.

4. The line node of claim 3, wherein the reference signal has a wavelength within a spectrum associated with a conventional dense wavelength division multiplexing laser.

5. The line node of claim 3, further comprising an optical filter disposed between the output of the first stage and the input of the second stage and configured to generate the extracted reference signal from the signal.

6. The line node of claim 5, wherein the extracted reference signal reflects an amount of residual dispersion present in the received signal as well as an amount of chromatic dispersion from a link in the optical transmission system immediately preceding the line node.

7. The line node of claim 1, wherein the chromatic dispersion compensator is tunable and has a finite resolution, and the dispersion-compensated signal includes an amount of uncorrected residual dispersion.

8. An optical transmission system, comprising:
   a line node that includes:
      a dual-stage amplifier that includes a first stage and a second stage,
      phase detection circuitry disposed between an output of the first stage and an input of the second stage and configured to measure a phase change in an extracted reference signal and compute an implied dispersion based on the phase change, wherein the phase detection circuitry is configured to use a mapping of phase change as a function of wavelength for a plurality of extracted reference signals to compute the implied dispersion, and
      a chromatic dispersion compensator disposed between the output of the first stage and the input of the second stage and configured to dispersion compensate a signal received at the first stage, based on the implied dispersion, to produce a dispersion-compensated signal that is transmitted to the second stage; and
   a transmission node optically coupled to the line node.

9. The optical transmission system of claim 8, wherein the second stage of the line node is configured to amplify the dispersion-compensated signal for transmission to another line node in the optical transmission system.

10. The optical transmission system of claim 8, wherein the signal received at the first stage of the line node comprises a reference signal and a data signal.

11. The optical transmission system of claim 10, wherein the line node further includes an optical filter that is disposed between the output of the first stage and the input of the second stage and is configured to generate the extracted reference signal from the tapped signal.

12. The optical transmission system of claim 11, wherein the extracted reference signal reflects an amount of residual dispersion present in the received signal as well as an amount of chromatic dispersion from a link in the optical transmission system immediately preceding the line node.

13. The optical transmission system of claim 8, wherein the chromatic dispersion compensator is tunable and has a finite resolution, and the dispersion-compensated signal includes an amount of uncorrected residual dispersion.

14. An optical transmission system, comprising:
a line node that includes:
a dual-stage amplifier that includes a first stage and a second stage,
phase detection circuitry disposed between an output of the first stage and an input of the second stage and configured to measure a phase change in an extracted reference signal and compute an implied dispersion based on the phase change, and
a chromatic dispersion compensator disposed between the output of the first stage and the input of the second stage and configured to dispersion compensate a signal received at the first stage, based on the implied dispersion, to produce a dispersion-compensated signal that is transmitted to the second stage;
a transmission node optically coupled to the line node, wherein the transmission node has a first stage, a mid-stage coupler/tap and a second stage; and
wavelength stabilized dense wavelength division multiplexing lasers configured to combine a red/blue laser pair into a plurality of signals and to modulate the signals onto sine waves of different frequencies to produce a plurality of reference signals.

15. The optical transmission system of claim 14, wherein the reference signals have wavelengths within a spectrum that allow the reference signals to pass through the dual-stage amplifier in the line node.

16. The optical transmission system of claim 14, wherein the mid-stage coupler/tap of the transmission node is configured to combine a plurality of data signals with the plurality of reference signals to produce a plurality of combined signals.

17. The optical transmission system of claim 16, wherein the second stage of the transmission node is configured to amplify the combined signals for transmission to the line node or another line node in the optical transmission system via an optical link.

* * * * *